United States Patent
Rivi et al.

[11] Patent Number: 5,966,062
[45] Date of Patent: Oct. 12, 1999

[54] MAGNETOPERMANENT PLATE

[75] Inventors: Giovanni Rivi; Davide Rivi; Roberta Rivi, all of Valentino Di Castellarano, Italy

[73] Assignee: Rivi Giovanni & C.S.N.C, Sassuolo, Italy

[21] Appl. No.: 09/289,548
[22] Filed: Apr. 9, 1999
[51] Int. Cl.$^6$ .................................................. H01F 7/20
[52] U.S. Cl. ........................... 335/289; 335/292; 335/299
[58] Field of Search .................................... 335/285–296, 335/299; 269/8

[56] References Cited

U.S. PATENT DOCUMENTS

| | | | |
|---|---|---|---|
| 3,398,004 | 8/1968 | Pendleton | 339/299 |
| 4,847,582 | 7/1989 | Cardone et al. | 335/289 |
| 5,140,292 | 8/1992 | Aronow | 336/205 |
| 5,801,334 | 9/1998 | Theodorides | 174/120 SR |

*Primary Examiner*—Lincoln Donovan
*Assistant Examiner*—Raymond Barrera
*Attorney, Agent, or Firm*—Fenwick & West, LLP

[57] ABSTRACT

An improved magnetopermanent plate, constituted by a metallic body with high magnetic permeability, in the active plane of which there are provided hollow seats for accommodating corresponding coils composed of turns of electrically conducting wire covered with a sheath made of a material based on fluorocarbon resins; the turns are further mutually bound by means of a vitreous medium and are enclosed in a likewise vitreous protective element; the coils can be accommodated in the hollow seats, between which magnetopermanent means with a low polarization temperature coefficient are accommodated; means are provided for retaining the coils in the corresponding hollow seats.

10 Claims, 2 Drawing Sheets

MAGNETOPERMANENT PLATE

BACKGROUND OF THE INVENTION

The present invention relates to an improved magnetopermanent plate.

Magnetopermanent plates which anchor metal parts, such as molds or the like, to particular machines in order to produce various products have long been used in various fields.

For example, said plates are often used in the ceramics industry for tilemaking: they are in fact meant to provide the support for the molds in presses, and said support must be as strong and precise as possible, in order to prevent the hammer, by falling onto the mold, from irreparably damaging the entire unit due to an even minimal accidental displacement.

In practice, conventional plates are constituted by a solid body made of ferromagnetic material, in which parallel grooves are provided which are in practice mutually similar slots in which the coils are positioned and fixed; the energization of the coils produces the anchoring effect.

Currently there are substantially two types of said plates: a first one, of the so-called flux-reversal type, in which the neutrality of the surface, which is periodically required for example to replace the molds, is provided by reversing the polarity of some magnetic poles, so as to close the field lines below the active contact surface; and a second one, of the full demagnetization type, in which the demagnetization of the active contact surface is achieved by means of a procedure for demagnetizing the permanent magnets located in the plates in order to bring residual induction to zero.

In both cases, the demagnetization of the magnets occurs by acting on the same coils used for magnetization and therefore for the activation of the attraction force.

These coils are usually constituted by windings of enameled copper wire, which are wrapped in a containment wrapping formed by means of a cotton tape and are inserted in said grooves, inside which they are locked by poured epoxy resin; the grooves are then closed with a brass bar.

The enameled copper wire currently used to form said coils has a maximum operating temperature that is significantly lower than 200° C., while the epoxy resin has a maximum attainable limit of approximately 160° C.

These limits prevent the use of magnetopermanent plates in molds used for the production of items made of thermosetting plastics or elastomers.

These molds must in fact operate at temperatures close to 200° C. in order to allow correct processing of the raw materials; during the heating step, in order to overcome a natural thermal inertia of the metals that constitute said molds, the temperature may exceed the above threshold of 200° C. and be then brought to a steady-state value.

The materials that compose the coils and the epoxy resins that retain them in the grooves collapse at these temperatures: the coils burn and the resins soften, losing their ability to provide mechanical retention.

This makes the plate unusable.

Additionally, another drawback which is typical of magnetopermanent plates, particularly of the type that uses flux reversal for demagnetization, resides in the fact that some of the magnetopermanent materials used, such as rare earths or ferrites, have high polarization temperature coefficients and this causes a decrease in the attraction force as the operating temperature increases.

Finally, magnetopermanent plates meant for use in machine tools must be impermeable to the emulsified water usually used for machining.

The penetration of said emulsion (water and oil) in the coil seats causes aggression of the insulation of the wire that composes said coils, which are accordingly damaged, thus making the plate unusable.

SUMMARY OF THE INVENTION

The technical aim of the present invention is to solve the above-mentioned problems of the prior art by providing an improved magnetopermanent plate which can be used also at temperatures close to the threshold of 200° C. and which at the same time is not affected by infiltrations of water-based emulsions during use in machine tools.

This aim and other objects are achieved by an improved magnetopermanent plate constituted by a metallic body with high magnetic permeability, in the active plane of which there are provided hollow seats for accommodating corresponding coils, wherein said coils are composed of turns of electrically conducting wire covered with a sheath made of a material based on fluorocarbon resins, said turns being further mutually bound by means of a vitreous medium and being enclosed in a likewise vitreous protective element, said coils being arrangeable in said hollow seats, between which magnetopermanent means with a low polarization temperature coefficient are accommodated, means being provided for retaining the coils in the corresponding hollow seats.

BRIEF DESCRIPTION OF THE DRAWINGS

Further characteristics and advantages will become apparent from the description of a preferred embodiment of an improved magnetopermanent plate, illustrated only by way of non-limitative example in the accompanying drawings, wherein.

DESCRIPTION OF THE PREFERRED EMBODIMENTS

Figure 1:
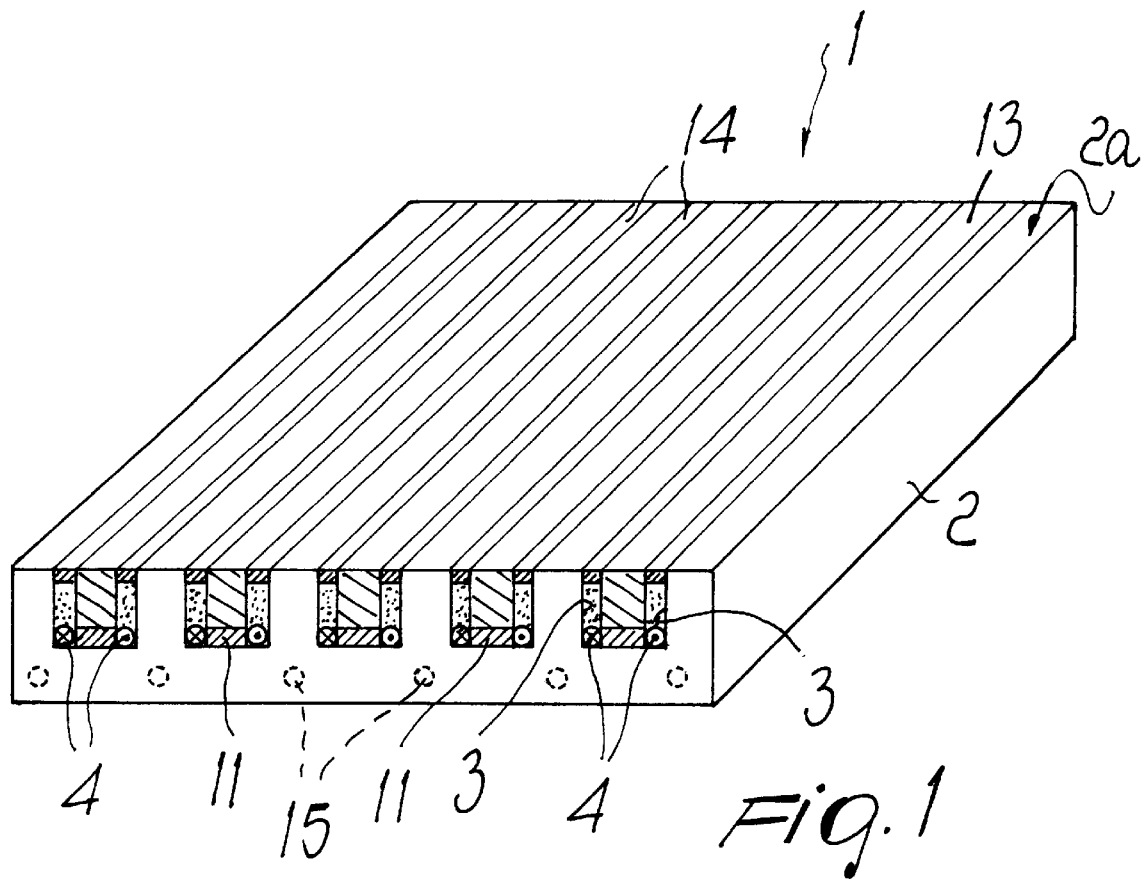
FIG. 1 is a schematic perspective view of an improved magnetopermanent plate.
Figure 2:
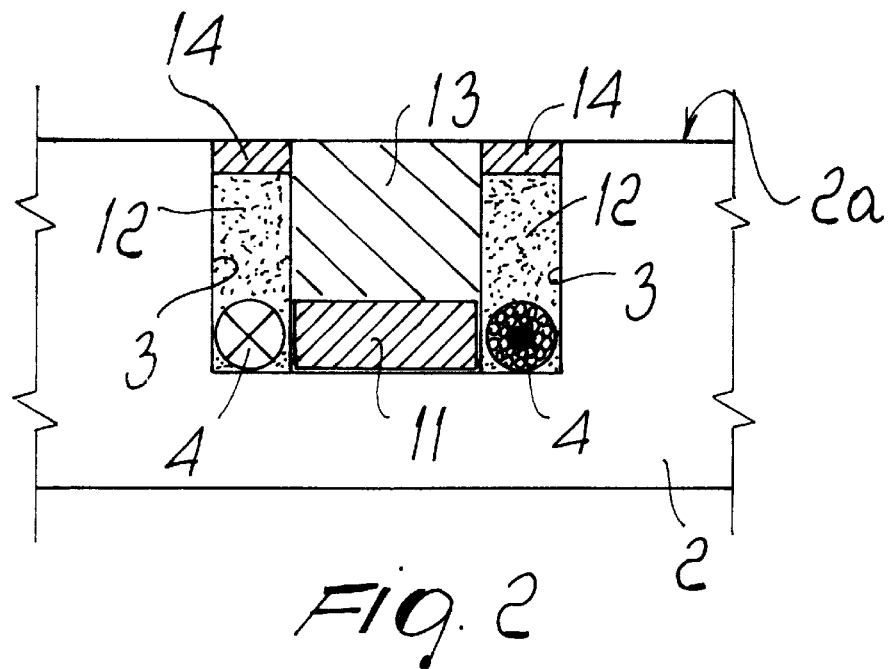
FIG. 2 is an enlarged-scale view of a detail of an individual modular magnetization portion.
Figure 3:
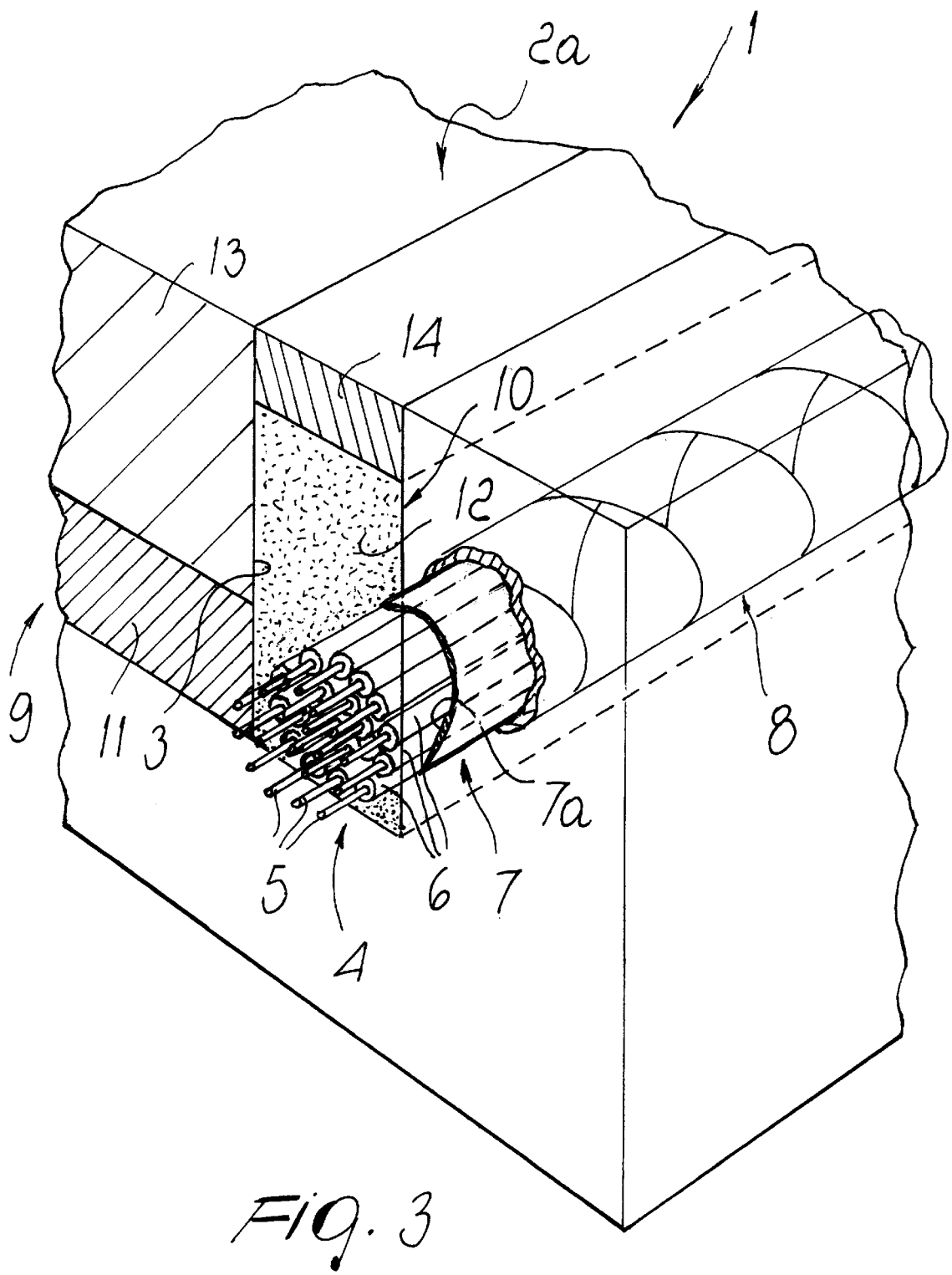
FIG. 3 is a highly enlarged-scale schematic cutout view of a part of the modular portion of FIG. 2.

With particular reference to the above figures, the reference numeral 1 generally designates an improved magnetopermanent plate constituted by a metal body 2 with high magnetic permeability.

Mutually parallel hollow seats 3 are formed in the active plane 2a of said body by obtaining them from the solid block or by assembly; said seats are arranged longitudinally and can accommodate corresponding coils 4.

Said coils are composed of turns of electrically conducting wire 5 which is covered with a sheath 6 made of a material based on fluorocarbon resins.

In turn, the turns are mutually bound with a vitreous medium 7 and are enclosed in a likewise vitreous protective element 8; each one of the coils 4 can also be accommodated in a corresponding hollow seat 3.

Magnetopermanent means 9 with a low polarization temperature coefficient are accommodated between the hollow seats 3; there are also provided means 10 for retaining the coils 4 in the corresponding hollow seats 3.

Said vitreous medium 7 for binding the turns 5 is constituted by a tape-like body 7a which can be wrapped around said turns.

The protective element 8 is constituted by a peripheral wrapping 8a which contains the group of turns 5.

The magnetopermanent means 9 with low polarization temperature coefficient are constituted by blocks 11 which are interposed between two adjacent portions of the coils 4.

The hollow seats 3 are closed flush with the active plane 2a with a pole extension 13 having a high magnetic permeability; its transverse dimensions are smaller than the width of the hollow seats 3, and this forms, between said extension and the metallic body 2, corresponding pairs of bilateral gaps in which the means 10 for retaining the coils are inserted; said means are constituted by poured silicone resin 12.

Corresponding bars 14 made of diamagnetic material can further be inserted snugly and again flush with said active plane 2a, so as to close the gaps.

Additional longitudinal seats 15 are further formed in the metal body 2 and are alternated with the hollow seats 3; corresponding conventional heating means can be inserted in said additional seats.

The operation of the invention is fully similar to the operation of a conventional magnetic plate.

The presence of the blocks 11 of magnetopermanent material allows to keep the attraction force of the plate 1 active also when the coils 4 are not energized.

Moreover, the particular nature of the fluorocarbon resin sheath 6, the protective wrapping 8a made of vitreous-fiber material and the poured silicone resin 12 allow, thanks to the resistance to heating offered by these materials, to reach steady-state operating temperatures of the plate 1 close to 200° C. and to exceed, albeit momentarily, this threshold in order to bring the plate 1 to said optimum operating state without thereby causing organoleptic modifications of the components of said plate, ultimately making it much stronger than conventional plates.

Moreover, said fluorocarbon resin sheath 6 prevents the water for cooling the machines on which the magnetopermanent plates 1 are usually used from reaching the conducting wire 5 that constitutes the turns of the coils 4, protecting them against gradual deterioration.

It has thus been observed that the described invention achieves the intended aim.

The invention thus conceived is susceptible of modifications and variations, all of which are within the scope of the inventive concept.

All the details may further be replaced with other technically equivalent elements.

In the practical embodiment of the invention, the materials used, as well as the shapes and the dimensions, may be any according to requirements without thereby abandoning the protective scope of the appended claims.

What is claimed is:

1. An improved magnetopermanent plate, constituted by a metallic body with high magnetic permeability, in the active plane of which there are provided hollow seats for accommodating corresponding coils, wherein said coils are composed of turns of electrically conducting wire covered with a sheath made of a material based on fluorocarbon resins, said turns being further mutually bound by means of a vitreous medium and being enclosed in a likewise vitreous protective element, said coils being arrangeable in said hollow seats, between which magnetopermanent means with a low polarization temperature coefficient are accommodated, means being provided for retaining the coils in the hollow seats.

2. The plate according to claim 1, wherein said vitreous medium for binding the turns is constituted by a tape-like body which can be wrapped around said turns.

3. The plate according to claim 1, wherein said protective element is constituted by a peripheral wrapping.

4. The plate according to claim 1, wherein said magnetopermanent means with low polarization temperature coefficient are constituted by blocks which are interposed between two adjacent portions of the coils.

5. The plate according to claim 1, wherein said means for retaining the coils in the corresponding hollow seats are constituted by poured silicone resin.

6. The plate according to claim 1, wherein said hollow seats can be closed in an upward region flush with said active plane with a pole extension having high magnetic permeability.

7. The plate according to claim 6, wherein said pole extension has transverse dimensions which are smaller than the width of said hollow seats, corresponding pairs of bilateral gaps remaining between said extension and said metal body.

8. The plate according to claim 7, wherein corresponding bars made of diamagnetic material can be inserted snugly and flush with said active plane in said pairs of gaps.

9. The plate according to claim 7, wherein a silicone-based setting resin can be poured into said pairs of gaps.

10. The plate according to claim 1, wherein additional longitudinal seats are formed in said metal body and are alternated with said hollow seats or are arranged transversely thereto for the insertion of corresponding heating means.

* * * * *